D. S. JACKSON.
FUNNEL.
APPLICATION FILED FEB. 3, 1921.
1,379,569. Patented May 24, 1921.
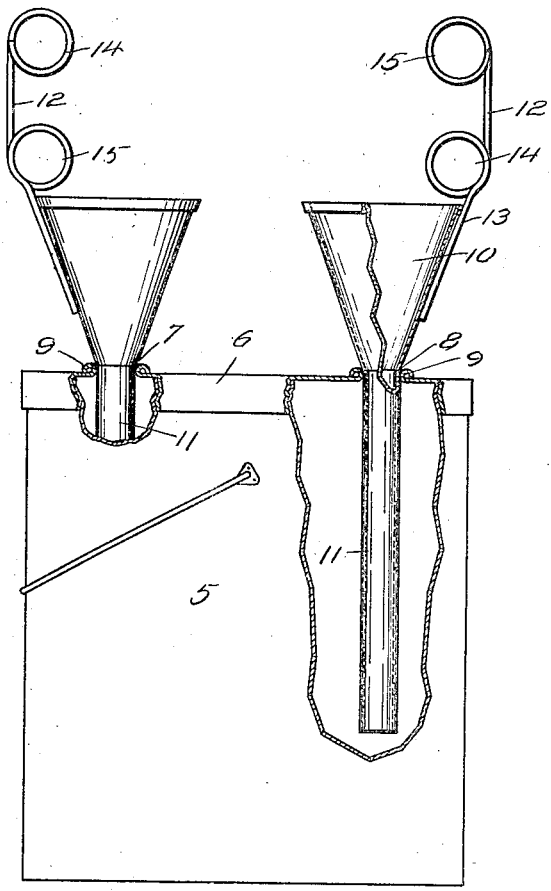
Inventor
D. S. Jackson.
By
Geo. F. Kimmel. Attorney

UNITED STATES PATENT OFFICE.

DEAN STANLEY JACKSON, OF ALBANY, NEW YORK.

FUNNEL.

1,379,569.     Specification of Letters Patent.     Patented May 24, 1921.

Application filed February 3, 1921. Serial No. 442,133.

*To all whom it may concern:*

Be it known that I, DEAN STANLEY JACKSON, a citizen of the United States, residing at Albany, in the county of Albany and State of New York, have invented certain new and useful Improvements in Funnels, of which the following is a specification.

This invention relates to funnels and more particularly to that type of funnels adapted for use in connection with milk pails and the like and adapted to be supported by the fingers of the person milking a cow, so that the milk will pass directly into the can without coming in contact with the hand or extraneous foreign matter.

The primary object of the invention is directed to a funnel capable of being positioned in a container and adapted to be loosely carried or supported from the fingers of the person and being so simple in construction as to permit the same to be suited for use in various angular positions with respect to the milk pail top without being dislodged or removed therefrom during the milking operation.

A still further and important object of the invention is the construction of a funnel having a novel and improved form of hand hold or finger grip on the same permitting the use of at least two funnels during the milking operation and so designed as to prevent the hand from coming in contact with the milk at all times.

A still further object of the invention is directed to a novel and improved form of funnel which is extremely simple in construction, efficient in operation and use, highly desirable for its intended purpose and otherwise of such construction as to permit the same to be manufactured at an extremely low cost.

With these objects in view and others which will be suggested and manifest as the nature and purpose of my invention are revealed in the following specification and drawing, the figure of the drawing shows the invention in use in connection with a milk pail.

Referring now to the drawing wherein similar numerals designate like and corresponding parts throughout the specification, 5 designates the usual type of milk pail provided with a flanged cover 6 and having a plurality of apertures 7, 8 therein for receiving the funnels subsequently to be described.

The respective openings 7, 8 are preferably beaded as shown at 9 it being observed that the same readily permit the said funnels to be inclined at various angular positions during the milking operation as is well understood.

The funnel 10 is provided with an elongated extension 11, extending considerably within the interior of the milk pail so that the funnel will not be easily or readily dislodged or removed from the cover 6 during the milking operation as is well understood. A finger grip 12 is soldered or otherwise secured at 13 and at one side of the funnel, said finger grip being provided with finger holds 14, 15, whereby the funnel may be loosely supported and suspended from the fingers of the operator during the milking operation. It will be observed that the construction of the funnel is of such form as to permit two of the same to be used during the milking operation, one for each hand. Furthermore the extensions 11 may be raised or lowered as desired during the milking operation to suit the needs of the person. A further and more extended description of the simple structure is thought unnecessary in view of the clear drawing which constitutes a part of the present application.

However in the accompanying drawings I have illustrated my invention embodied in one form by way of example and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention what I now claim as new and desire to secure by Letters Patent of the U. S. is:—

1. An article of manufacture comprising an open funnel having an elongated extension and a resilient finger grip secured to the side of said funnel and extending considerably above and inwardly of the top thereof for supporting the same.

2. An article of manufacture comprising a funnel having an elongated extension, a resilient finger grip soldered to the side of said funnel, said finger grip having a plurality of finger holds extending inwardly of the funnel for supporting the same.

3. An article of manufacture comprising an open funnel having a finger grip secured to the side and overlying the top of said funnel for supporting the same.

4. An article of manufacture comprising an open funnel having a resilient finger grip secured to the side and overlying the top edge of said funnel for supporting the same.

5. An article of manufacture comprising an open funnel having plural finger holds secured to the outer side and overlying the top edge of said funnel for supporting the same.

6. An article of manufacture comprising an open funnel having an elongated extension secured to the outer side and provided with plural finger holds rising vertically and inwardly of the top edge for supporting said funnel, said extensions and finger holds being formed from a single piece of material.

In testimony whereof, I affix my signature hereto.

DEAN STANLEY JACKSON.